US011194917B2

(12) United States Patent
Zeng

(10) Patent No.: US 11,194,917 B2
(45) Date of Patent: Dec. 7, 2021

(54) INFORMATION ENCRYPTION METHOD AND DEVICE

(71) Applicants: Beijing Jingdong Shangke Information Technology Co., Ltd., Beijing (CN); Beijing Jingdong Century Trading Co., Ltd., Beijing (CN)

(72) Inventor: Lifa Zeng, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 74 days.

(21) Appl. No.: 16/490,003

(22) PCT Filed: Mar. 23, 2018

(86) PCT No.: PCT/CN2018/080195
§ 371 (c)(1),
(2) Date: Aug. 29, 2019

(87) PCT Pub. No.: WO2018/177206
PCT Pub. Date: Oct. 4, 2018

(65) Prior Publication Data
US 2020/0013316 A1   Jan. 9, 2020

(30) Foreign Application Priority Data

Mar. 31, 2017   (CN) .......................... 201710208832.6

(51) Int. Cl.
*G06F 21/60* (2013.01)
*G09C 1/00* (2006.01)
(Continued)

(52) U.S. Cl.
CPC ............. *G06F 21/602* (2013.01); *G09C 1/00* (2013.01); *H04L 9/0643* (2013.01); *H04L 9/0869* (2013.01); *H04L 2209/12* (2013.01)

(58) Field of Classification Search
CPC .................................................. G06F 21/602
See application file for complete search history.

(56) References Cited

U.S. PATENT DOCUMENTS 8,204,213 B2 *   6/2012   Hunt ................. G06F 16/90335
                                                          380/28
2005/0277405 A1   12/2005   Noguchi
(Continued)

FOREIGN PATENT DOCUMENTS

CN           1300404 A           6/2001
CN           1992586 A           4/2007
(Continued)

OTHER PUBLICATIONS

International Search Report re Application No. PCT/CN2018/080195 (WO 20181177206 A1), dated May 16, 2018.

*Primary Examiner* — Simon P Kanaan
(74) *Attorney, Agent, or Firm* — Blank Rome LLP

(57) ABSTRACT

Disclosed are an information encryption method and device. A particular embodiment of the method comprises: acquiring customer information, wherein the customer information comprises an item number and a telephone number; selecting a random salt corresponding to the current date from a pre-generated random salt list, wherein the random salt list is used for storing a date and a random salt; using an irreversible encryption algorithm to encrypt the item number and the random salt corresponding to the current date so as to generate a first ciphertext; generating, based on the first ciphertext, a digital second ciphertext; and using the second ciphertext to process the telephone number so as to generate
(Continued)

a first encrypted telephone number. This embodiment prevents private customer information from being leaked.

15 Claims, 5 Drawing Sheets

(51) Int. Cl.
*H04L 9/06* (2006.01)
*H04L 9/08* (2006.01)

(56) References Cited

U.S. PATENT DOCUMENTS

2006/0285684 A1 12/2006 Rogaway
2016/0366115 A1 12/2016 Khalid et al.

FOREIGN PATENT DOCUMENTS

| | | |
|---|---|---|
| CN | 101127062 A | 2/2008 |
| CN | 101378542 A | 3/2009 |
| CN | 101860525 A | 10/2010 |
| CN | 102509030 A | 6/2012 |
| CN | 102638447 A | 8/2012 |
| CN | 102780674 A | 11/2012 |
| CN | 103428691 A | 12/2013 |
| CN | 103475463 A | 12/2013 |
| CN | 103802528 A | 5/2014 |
| CN | 104915816 A | 9/2015 |
| CN | 104933371 A | 9/2015 |
| CN | 105138585 A | 12/2015 |
| CN | 105281897 A | 1/2016 |
| CN | 105721390 A | 6/2016 |
| CN | 105966111 A | 9/2016 |
| CN | 106302472 A | 1/2017 |
| CN | 106453268 A | 2/2017 |
| WO | 2018177206 A1 | 10/2018 |

* cited by examiner

INFORMATION ENCRYPTION METHOD AND DEVICE

The present patent application is a US national stage of International Application No. PCT/CN2018/080195, filed Mar. 23, 2018, which claims priority to Chinese Patent Application No. 201710208832.6, filed on Mar. 31, 2017, the contents of which are incorporated herein by reference in their entireties.

TECHNICAL FIELD

The present disclosure relates to the field of computer technology, specifically to the field of information encryption technology, and more specifically to a method and apparatus for information encryption.

BACKGROUND

With the rapid development of the e-commerce platform and logistics information technology, the electronic order sheet has become a hub for a logistics service provider to connect various kinds of information, such as an express waybill, an order, a seller, and an item, in series. The electronic order sheet, generally also known as a thermo-sensitive paper express label, an economical order sheet, or a two-dimensional order sheet, is generally a self-adhesive label of rolled or stacked three-layer thermo-sensitive paper, and the information, such as a name, a contact number, and an address of a customer, will generally be printed on the label.

The electronic order sheet has been successfully used in the domestic and international logistics industry for many years, because of its advantages, such as high printing efficiency, and low labor costs. However, the contact number and other private information of the customer are printed on the electronic order sheet, and once the electronic order sheet is lost, the privacy information of the customer will be revealed.

SUMMARY

An object of the present disclosure is to provide an improved method and apparatus for information encryption, to solve the technical problems mentioned in the above background portion.

In a first aspect, an embodiment of the present disclosure provides a method for information encryption, including: acquiring customer information, the customer information including an item order number and a telephone number; selecting a random salt corresponding to a current date from a pre-generated random salt list, the random salt list used for storing dates and random salts; encrypting the item order number and the random salt corresponding to the current date using an irreversible encryption algorithm to generate a first ciphertext; generating a numeric second ciphertext based on the first ciphertext; and processing the telephone number using the second ciphertext to generate a first encrypted telephone number.

In some embodiments, the generating a numeric second ciphertext based on the first ciphertext includes: determining whether there is a letter in the first ciphertext; replacing the letter in the first ciphertext with a preset numeral corresponding to the letter in response to determining there being the letter in the first ciphertext, and extracting a preset number of numerals from a preset position of the replaced first ciphertext to generate the second ciphertext.

In some embodiments, the method further includes: extracting a preset number of numerals from a preset position of the first ciphertext to generate the second ciphertext in response to determining there not being the letter in the first ciphertext.

In some embodiments, the processing the telephone number using the second ciphertext to generate a first encrypted telephone number includes: perform an addition or subtraction operation on the telephone number and the second ciphertext to generate the first encrypted telephone number.

In some embodiments, the random salt list is further used for storing codes; and the method further includes: selecting a code corresponding to the current date from the random salt list; combining the code corresponding to the current date with the first encrypted telephone number to generate a second encrypted telephone number.

In some embodiments, the method further includes updating the random salt list, and the updating the random salt list includes: periodically determining whether there is a random salt corresponding to the current date and/or a future date in the random salt list; and generating the random salt corresponding to the current date and/or the future date in the random salt list in response to determining there not being the random salt corresponding to the current date and/or the future date in the random salt list, and writing the generated random salt into a line' of the current date and/or the future date in the random salt list.

In some embodiments, the irreversible encryption algorithm is Message Digest Algorithm version 5.

In a second aspect, an embodiment of the present disclosure provides an apparatus for information encryption, including: a customer information acquiring unit, configured to acquire customer information, the customer information including an item order number and a telephone number; a random salt selecting unit, configured to select a random salt corresponding to a current date from a pre-generated random salt list, the random salt list used for storing dates and random salts; a first ciphertext generating unit, configured to encrypt the item order number and the random salt corresponding to the current date using an irreversible encryption algorithm to generate a first ciphertext; a second ciphertext generating unit, configured to generate a numeric second ciphertext based on the first ciphertext; and a first encrypted telephone number generating unit, configured to process the telephone number using the second ciphertext to generate a first encrypted telephone number.

In some embodiments, the second ciphertext generating unit includes: a first ciphertext determining subunit, configured to determine whether there is a letter in the first ciphertext; a second ciphertext generating subunit, configured to replace the letter in the first ciphertext with a preset numeral corresponding to the letter in response to determining there being the letter in the first ciphertext, and extract a preset number of numerals from a preset position of the replaced first ciphertext to generate the second ciphertext.

In some embodiments, the second ciphertext generating subunit is further configured to: extract a preset number of numerals from a preset position of the first ciphertext to generate the second ciphertext in response to determining there not being the letter in the first ciphertext.

In some embodiments, the first encrypted telephone number generating unit is further configured to: perform an addition or subtraction operation on the telephone number and the second ciphertext to generate the first encrypted telephone number.

In some embodiments, the random salt list is further used for storing codes; and the apparatus further includes: a code selecting unit, configured to select a code corresponding to the current date from the random salt list; a second encrypted telephone number generating unit, configured to combine the code corresponding to the current date with the first encrypted telephone number to generate a second encrypted telephone number.

In some embodiments, the apparatus further includes a random salt list updating unit, and the random salt list updating unit includes: a random salt determining subunit, configured to periodically determine whether there is a random salt corresponding to the current date and/or a future date in the random salt list; and a random salt generating subunit, configured to generate the random salt corresponding to the current date and/or the future date in the random salt list in response to determining there not being the random salt corresponding to the current date and/or the future date in the random salt list, and write the generated random salt into a line of the current date and/or the future date in the random salt list.

In some embodiments, the irreversible encryption algorithm is Message Digest Algorithm version 5.

In a third aspect, an embodiment of the present disclosure provides an electronic device, including: one or more processors; and a storage apparatus, configured to store one or more programs, where the one or more programs, when executed by the one or more processors, cause the one or more processors to implement the method according to any one implementation in the first aspect.

In a fourth aspect, an embodiment of the present disclosure provides a computer readable storage medium, storing a computer program thereon, where the computer program, when executed by a processor, implements the method according to any one implementation in the first aspect.

The method and apparatus for information encryption provided by the embodiments of the present disclosure encrypts an item order number of customer information and a random salt corresponding to a current date using an irreversible encryption algorithm to generate a first ciphertext; then generate a numeric second ciphertext based on the first ciphertext; and finally process a telephone number of the customer information using the second ciphertext to obtain a first encrypted telephone number. An encrypted telephone number (i.e., the first encrypted telephone number) is printed on the electronic order sheet, thereby avoiding revealing customers' privacy information.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
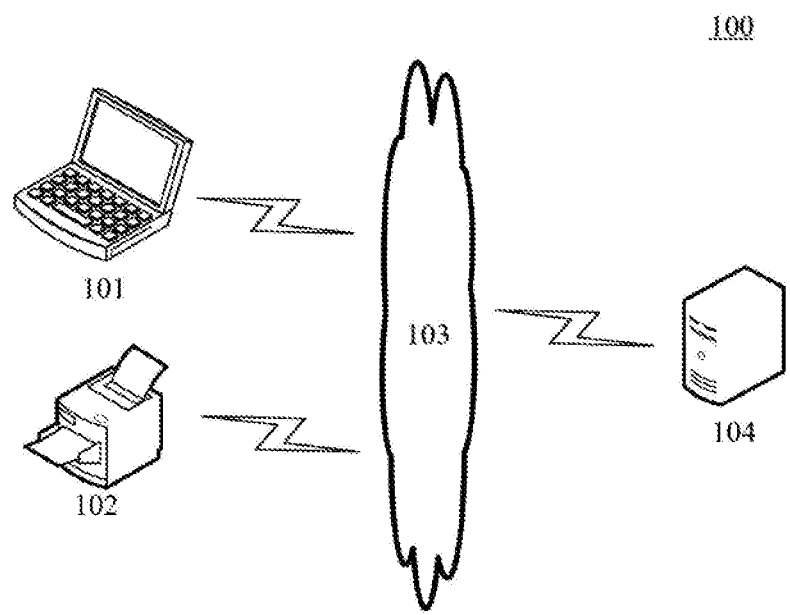
FIG. 1 is an architectural diagram of an exemplary system in which an embodiment of the present disclosure may be applied.

FIG. 1 shows an exemplary system architecture 100 in which an embodiment of a method for information encryption or an apparatus for information encryption according to the embodiments of the present disclosure may be applied.

As shown in FIG. 1, the system architecture 100 may include a terminal device 101, a printer 102, a network 103, and a server 104. The network 103 serves as a medium providing a communication link between the terminal device 101, the printer 102, and the server 104. The network 103 may include various types of connections, such as wired or wireless communication links, or optical fibers.

A user may interact with the server 104 using the terminal device 101 via the network 103 to receive or send a message. The terminal device 101 maybe provided with various kinds of software, such as office software, and printing software.

The terminal device 101 may be various electronic devices supporting information browsing, including but not limited to a smart telephone, a tablet computer, a laptop portable computer, a desktop computer, or the like.

The server 104 may be a server providing various services, such as a backend server providing support for information displayed on the terminal device 101. The backend server may process, e.g., analyze, customer information sent by the terminal device 101, and return the processing result (e.g., the first encrypted telephone number) to the terminal device 101.

The printer 102 may be a printer configured to print an electronic order sheet including the processing result (e.g., the first encrypted telephone number).

It should be noted that the method for information encryption provided in the embodiment of the present disclosure is generally executed by the server 104. Accordingly, the apparatus for information encryption is generally provided in the server 104.

It should be understood that the numbers of terminal devices, printers, networks, and servers in FIG. 1 are merely illustrative. Any number of terminal devices, printers, networks, and servers may be provided based on actual requirements.

Figure 2:
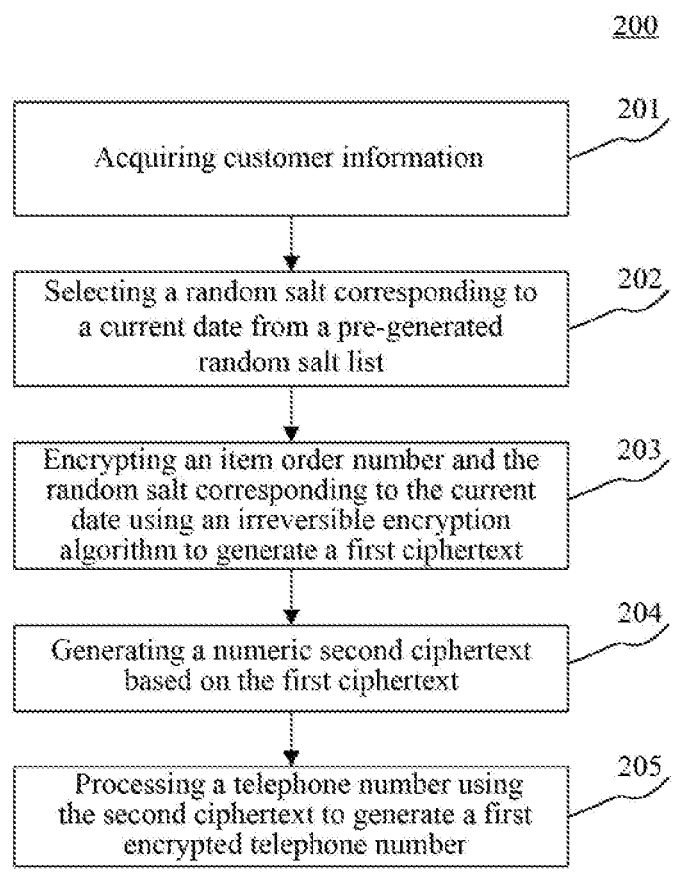
FIG. 2 is a flowchart of an embodiment of a method for information encryption according to the present disclosure.

Further referring to FIG. 2, a process 200 of an embodiment of a method for information encryption according to the present disclosure is shown. The method for information encryption includes the following steps.

Step 201: acquiring customer information.

In the present embodiment, an electronic device (e.g., the server 104 shown in FIG. 1) in which the method for information encryption runs may acquire the customer information from a client (e.g., the terminal device 101 shown in FIG. 1) communicatively connected to the electronic device. The customer information may include an item order number and a telephone number. The item order number may also be referred to as an express waybill number, is generally composed of numerals and/or letters, and is a unique identification code of an express parcel. An express company, a sender, and a consignee may track the express parcel by the item order number in real time.

Step 202: selecting a random salt corresponding to a current date from a pre-generated random salt list.

In the present embodiment, the electronic device may select the random salt corresponding to the current date from the pre-generated random salt list. The random salt is a randomly generated character string, and may include random capital and small letters, numerals, and characters, a number of which may be set as required. The random salt list may be used for storing dates and random salts. Different dates generally correspond to different random salts.

As an example, the random salt list may store the dates and the random salts in a form as shown in Table 1.

TABLE 1

| Date | Random salt |
| --- | --- |
| 2017 Jan. 1 | F2DA9A9DC78F51D3B49AD6AD05E66465 |
| 2017 Jan. 2 | 3118C00E769827C4528D3DAD453A8E55 |
| 2017 Jan. 3 | 0765ECEBDFD669179ABC6CB4EFD499B9 |
| ... | ... |
| 2017 Dec. 30 | 9EC1124DBA808065D31AC69545B66B1A |
| 2017 Dec. 31 | 7416F7F8335378B18567E0E51890ED37 |

If the current date is "2017/1/1," the electronic device may acquire a random salt "F2DA9A9DC78F51D3B49AD6AD05E66465" corresponding to the current date by querying Table 1.

Step 203: encrypting an item order number and the random salt corresponding to the current date using an irreversible encryption algorithm to generate a first ciphertext.

In the present embodiment, the electronic device may encrypt the item order number and the random salt corresponding to the current date using the irreversible encryption algorithm to generate the first ciphertext based on the item order number acquired in step 201 and the random salt corresponding to the current date selected in step 202. The item order number and the random salt corresponding to the current date are plaintexts, and the first ciphertext is a ciphertext corresponding to the item order number and the random salt corresponding to the current date.

Here, the irreversible encryption algorithm is characterized by directly processing an inputted plaintext into a ciphertext by a system using an encryption algorithm without the need for using a secret key in an encryption process. Such encrypted data cannot be decrypted. Only by re-inputting the plaintext, and reprocessing the plaintext using the same irreversible encryption algorithm to obtain the same encrypted ciphertext, and reidentify the encrypted ciphertext by the system, may the encrypted data be really decrypted.

In some alternative implementations of the present embodiment, the irreversible encryption algorithm is MD5 (Message Digest Algorithm version 5). The MD5 is a hash function that is widely used in the field of computer security to provide message integrity protection. The MD5 plays a role in "compressing" large-capacity information into a confidential format before signing a private secret key using digital signature software, i.e., converting a byte string of any length into a hexadecimal numeric string of a fixed length.

As an example, if the item order number is "1198073208-1-2-7," and the random salt corresponding to the current date is "F2DA9A9DC78F51D3B49AD6AD05E66465," then the electronic device encrypts the item order number and the random salt corresponding to the current date using the MD5: Vmd5=MD5 ("1198073208-1-2-7"+ "F2DA9A9DC78F51D3B49AD6AD05E66465") =C2D8B4A40A5E3595D851ADFB6E384805.

The first ciphertext is "C2D8B4A40A5E3595D851ADFB6E384805."

Step 204: generating a numeric second ciphertext based on the first ciphertext.

In the present embodiment, the electronic device may generate the numeric second ciphertext based on the first ciphertext generated in step 203.

Under normal conditions, the first ciphertext obtained by the electronic device using the irreversible encryption algorithm is a hexadecimal character string. Since a hexadecimal number is composed of 0-9 and A-F, there is generally a letter in the first ciphertext. This requests the electronic device to generate a letter-free numeric second ciphertext based on the first ciphertext.

In some alternative implementations of the present embodiment, the electronic device may convert the hexadecimal first ciphertext into a decimal number, and use the converted decimal number as the second ciphertext.

In some alternative implementations of the present embodiment, the electronic device may first convert the hexadecimal first ciphertext into a decimal number; and then extract a preset number of numerals from a preset position of the converted decimal number (e.g., extracting ten numerals from the first numeral of the converted decimal number) for use as the second ciphertext.

In some alternative implementations of the present embodiment, the electronic device may determine whether there is a letter in the first ciphertext; replace the letter in the first ciphertext with a preset numeral corresponding to the letter in response to determining there being the letter in the first ciphertext, and use the replaced first ciphertext as the second ciphertext. As an example, the first ciphertext is "C2D8B4A40A5E3595D851ADFB6E384805," and the electronic device may, by corresponding letters A-F to numerals 1-6 respectively, replace the letters in the first ciphertext with the numerals corresponding to the letters, to generate a replaced first ciphertext "32482414015535954851146265384805" for use as the second ciphertext.

In some alternative implementations of the present embodiment, the electronic device may determine whether there is a letter in the first ciphertext; and use the first ciphertext as the second ciphertext in response to determining there not being the letter in the first ciphertext.

In some alternative implementations of the present embodiment, the electronic device may determine whether there is a letter in the first ciphertext; replace the letter in the first ciphertext with the preset numeral corresponding to the letter in response to determining there being the letter in the first ciphertext, and extract a preset number of numerals from a preset position of the replaced first ciphertext (e.g., extracting ten numerals from the first numeral of the replaced first ciphertext), to generate the second ciphertext. As an example, the first ciphertext is "C2D8B4A40A5E3595D851ADFB6E384805," and the electronic device may, by corresponding the letters A-F to the numerals 1-6 respectively, replace the letters in the first ciphertext with the numerals corresponding to the letters, to generate the replaced first ciphertext "32482414015535954851146265384805," and extract ten numerals from the first numeral of the replaced first ciphertext to obtain "3248241401" for use as the second ciphertext.

In some alternative implementations of the present embodiment, the electronic device may determine whether there is a letter in the first ciphertext; and extract a preset number of numerals from a preset position of the first ciphertext (e.g., extracting ten numerals from the first numeral of the first ciphertext) to generate the second ciphertext in response to determining there not being the letter in the first ciphertext.

Step 205: processing a telephone number using the second ciphertext to generate a first encrypted telephone number.

In the present embodiment, the electronic device may process the telephone number using the second ciphertext to generate the first encrypted telephone number based on the second ciphertext generated in step 204 and the telephone number acquired in step 201. As an example, the electronic device may perform simple mathematical operation on the second ciphertext and the telephone number, and use the operating result as the first encrypted telephone number.

In some alternative implementations of the present embodiment, the electronic device may perform an addition or subtraction operation on the telephone number and the second ciphertext to generate the first encrypted telephone number.

As an example, if the second ciphertext is "3248241401," and the telephone number is "17090141339," then the electronic device may add the telephone number to the second ciphertext, and use a sum "20338382740" obtained by the addition as the first encrypted telephone number.

In some alternative implementations of the present embodiment, the electronic device may alternatively update the random salt list. The electronic device may periodically determine whether there is a random salt corresponding to the current date and/or a future date in the random salt list; and generate a random salt corresponding to the current date and/or the future date in the random salt list in response to determining there not being the random salt corresponding to the current date and/or the future date in the random salt list, and write the generated random salt into a line of the current date and/or the future date in the random salt list. As an example, the electronic device may query the random salt list at 0 o'clock every day, to determine whether there is a random salt corresponding to the current date and random salts corresponding to future 4 days in the random salt list, generate the random salt corresponding to the current date and the random salts corresponding to the future 4 days in the random salt list if there no random salt corresponding to the current date and random salts corresponding to the future 4 days in the random salt list, and write the generated random salt into the random salt list; and terminate the updating if there is the random salt corresponding to the current date and the random salts corresponding to the future 4 days in the random salt list.

Figure 3:
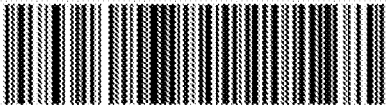
FIG. 3 is a schematic diagram of an application scenario corresponding to the embodiment shown in FIG. 2.

Further referring to FIG. 3, which is a schematic diagram of an application scenario corresponding to the embodiment shown in FIG. 2. In the application scenario of FIG. 3, a client first sends customer information to a server, where the customer information includes an item order number "1198073208-1-2-7;" and a telephone number "17090141339;" then the server selects a random salt "F2DA9A9DC78F51D3B49AD6AD05E66465" corresponding to the current date "2017/1/1" from a pre-generated random salt list; then, the server encrypts the item order number and the random salt corresponding to the current data using MD5 to generate a first ciphertext "C2D8B4A40A5E3595D851ADFB6E384805;" and then, the server, by corresponding letters A-F to numerals 1-6 respectively, replaces the letters in the first ciphertext with the numerals corresponding to the letters, to generate a replaced first ciphertext "32482414015535954851146265384805," and extracts ten numerals from the first numeral of the replaced first ciphertext to obtain "3248241401" for use as a second ciphertext. Finally, the server adds the telephone number to the second ciphertext to obtain a first encrypted telephone number "20338382740." The client prints an electronic order sheet, including print time, place of departure, destination, encrypted customer information, customer signature, and payment mode, using an electronic order sheet printer. FIG. 3 shows the electronic order sheet, where the print time is "2017-01-01 08:00:00," the place of departure is "Beijing," the destination is "Tianjin," and the customer information includes a consignee's name: "Wang ," a first encrypted telephone number: "20338382740," and an address: "Floor No., building No.**, Wuxi Road, Hexi District, Tianjin, China," and the payment mode is "online payment."

Here, a delivery clerk needs to locally decrypt the first encrypted telephone number in a process of delivering items, to acquire an unencrypted telephone number of a customer and then complete delivering the items. First, a handheld device of the delivery clerk is required to pre-store a random salt list; then the delivery clerk inputs a printing date "2017-01-01," the item order number "1198073208-1-2-7," and a first encrypted telephone number "20338382740" into the handheld device; then the handheld device finds out the random salt "F2DA9A9DC78F51D3B49AD6AD05E66465" corresponding to the data "2017-01-01" from the pre-stored random salt list, and encrypts the item order number and the random salt corresponding to the data "2017-01-01" using MD5 to generate the first ciphertext "C2D8B4A40A5E3595D851ADFB6E384805;" and then, the handheld device, by corresponding the letters A-F to the numerals 1-6 respectively, replaces the letters in the first ciphertext with the numerals corresponding to the letters, to generate a replaced first ciphertext "32482414015535954851146265384805," and extracts ten numerals from the first numeral of the replaced first ciphertext to obtain "3248241401" for use as the second ciphertext; and finally the handheld device subtracts the second ciphertext from the first encrypted telephone number to obtain the unencrypted telephone number "17090141339".

The method for information encryption provided by the embodiments of the present disclosure encrypts an item order number of customer information and a random salt corresponding to a current date using an irreversible encryption algorithm to generate a first ciphertext; then generates a numeric second ciphertext based on the first ciphertext; and finally processes a telephone number of the customer information using the second ciphertext to obtain a first encrypted telephone number. An encrypted telephone number is printed on the electronic order sheet, thereby avoiding revealing customers' privacy information.

Figure 4:
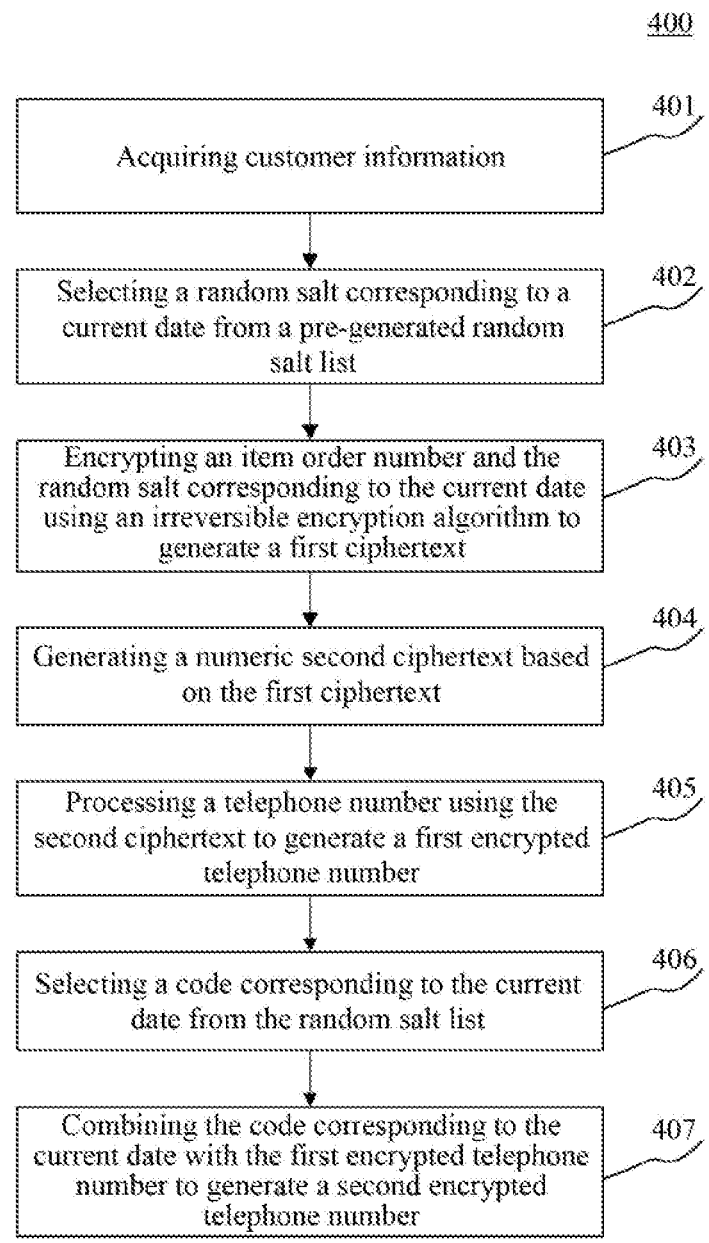
FIG. 4 is a flowchart of another embodiment of the method for information encryption according to the present disclosure.

Further referring to FIG. 4, a process 400 of another embodiment of the method for information encryption is shown. The process 400 of the method for information encryption includes the following steps.

Step 401: acquiring customer information.

In the present embodiment, an electronic device (e.g., the server 104 shown in FIG. 1) in which the method for information encryption runs may acquire the customer information from a client (e.g., the terminal device 101 shown in FIG. 1) communicatively connected to the electronic device. The customer information may include an item order number and a telephone number. The item order number may also be referred to as an express waybill number, is generally composed of numerals and/or letters, and is a unique identification code of an express parcel. An express company, a sender, and a consignee may track the express parcel by the item order number in real time.

Step 402: selecting a random salt corresponding to a current date from a pre-generated random salt list.

In the present embodiment, the electronic device may select the random salt corresponding to the current date from the pre-generated random salt list. The random salt is a randomly generated character string, and may include random capital and small letters, numerals, and characters, a number of which may be set as required. The random salt list may be used for storing dates and random salts. Different dates generally correspond to different random salts.

Step 403: encrypting an item order number and the random salt corresponding to the current date using an irreversible encryption algorithm to generate a first ciphertext.

In the present embodiment, the electronic device may encrypt the item order number and the random salt corresponding to the current date using the irreversible encryption algorithm to generate the first ciphertext based on the item order number acquired in step 401 and the random salt corresponding to the current date selected in step 402. The item order number and the random salt corresponding to the current date are plaintexts, and the first ciphertext is a ciphertext corresponding to the item order number and the random salt corresponding to the current date.

Step 404: generating a numeric second ciphertext based on the first ciphertext.

In the present embodiment, the electronic device may generate the numeric second ciphertext based on the first ciphertext generated in step 403.

Step 405: processing a telephone number using the second ciphertext to generate a first encrypted telephone number.

In the present embodiment, the electronic device may process the telephone number using the second ciphertext to generate the first encrypted telephone number based on the second ciphertext generated in step 404 and the telephone number acquired in step 401. As an example, the electronic device may perform simple mathematical operations on the second ciphertext and the telephone number, and use the operating results as the first encrypted telephone number.

Step 406: selecting a code corresponding to the current date from the random salt list.

In the present embodiment, the electronic device may select the code corresponding to the current date from the random salt list. The random salt list may be further used for storing codes. A field type of the codes is numeral. A given code corresponds to a given random salt, different codes generally correspond to different random salts.

Generally, the random salt list is further used for storing auto-incrementing primary keys. Field types of the auto-incrementing primary key are numeral, auto-increment, and primary key. The primary key is a row having a unique field that is not a null value. The code may generally be obtained by calculating a residue on a preset number via the auto-incrementing primary key, so that the preset number of random salts may be further recycled. As an example, the code may be obtained by calculating a residue on 100 via the auto-incrementing primary key. Thus, the random salt list may store auto-incrementing primary keys, codes, dates and random salts in a form as shown in Table 2.

TABLE 2

| Auto-incrementing primary key | Code | Date | Random salt |
|---|---|---|---|
| 102 | 2 | 2017 Jan. 2 | 3118C00E769827C4528D3DAD453A8E55 |
| 103 | 3 | 2017 Jan. 3 | 0765ECEBDFD669179ABC6CB4EFD499B9 |
| ... | ... | ... | ... |
| 464 | 64 | 2017 Dec. 30 | 9EC1124DBA808065D31AC69545B66B1A |
| 465 | 65 | 2017 Dec. 31 | 7416F7F8335378B18567E0E51890ED37 |

Step 407: combining the code corresponding to the current date with the first encrypted telephone number to generate a second encrypted telephone number.

In the present embodiment, the electronic device may combine the code corresponding to the current date with the first encrypted telephone number to generate the second encrypted telephone number based on the first encrypted telephone number generated in step 405 and the code corresponding to the current date selected in step 406. As an example, if the first encrypted telephone number is "20338382740," and the code corresponding to the current date is "01," then the electronic device may combine the code corresponding to the current date with the first encrypted telephone number to generate a second encrypted telephone number "0120338382740."

Figure 5:
FIG. 5 is a schematic diagram of an application scenario corresponding to the embodiment shown in FIG. 4.

Further referring to FIG. 5, FIG. 5 is a schematic diagram of an application scenario corresponding to the embodiment shown in FIG. 4. In the application scenario of FIG. 5, a client first sends customer information to a server, where the customer information includes an item order number "1198073208-1-2-7" and a telephone number "17090141339;" then the server selects a random salt "F2DA9A9DC78F51D3B49AD6ADO5E66465" corresponding to a current data "2017/1/1" from a pre-generated random salt list; then, the server encrypts the item order number and a random salt corresponding to the current data using MD5 to generate a first ciphertext "C2D8B4A40A5E3595D851ADFB6E384805;" and then, the server, by corresponding letters A-F to numerals 1-6 respectively, replaces the letters in the first ciphertext with the numerals corresponding to the letters, to generate a replaced first ciphertext "3248241401553595485114626538480 5," and extracts ten numerals from the first numeral of the replaced first ciphertext "3248241401" for use as a second ciphertext. Then, the server adds the telephone number to the second ciphertext to obtain a first encrypted telephone number "20338382740." Finally, the server selects a code "01"

corresponding to the current date from the random salt list, and then combines the code corresponding to the current date with the first encrypted telephone number to generate a second encrypted telephone number "0120338382740." The client prints an electronic order sheet, including print time, place of departure, destination, encrypted customer information, customer signature, and payment mode, using an electronic order sheet printer. FIG. 5 shows the electronic order sheet, where the print time is "2017-01-01 08:00:00," the place of departure is "Beijing," the destination is "Tianjin," and the customer information includes a consignee's name: "Wang ," a second encrypted telephone number: "0120338382740," and an address: "Floor No., building No.**, Wuxi Road, Hexi District, Tianjin, China," and the payment mode is "online payment."

Here, a delivery clerk needs to locally decrypt the second encrypted telephone number in a process of delivering items, to acquire an unencrypted telephone number of a customer, and then complete delivering the items. First, a handheld device of the delivery clerk is required to pre-store a random salt list; then the delivery clerk inputs an item order number "1198073208-1-2-7," and the second encrypted telephone number "0120338382740" on the electronic order sheet in FIG. 5 into the handheld device; then the handheld device decrypts the second encrypted telephone number to acquire the code "01" and the first encrypted telephone number "20338382740;" then, the handheld device finds out the random salt "F2DA9A9DC78F51D3B49AD6AD05E66465" corresponding to the code "01" from the pre-stored random salt list, and encrypts the item order number and a random salt corresponding to the code "01" using MD5 to generate a first ciphertext "C2D8B4A40A5E3595D851ADFB6E384805;" then, the handheld device, by corresponding letters A-F to numerals 1-6 respectively, replaces the letters in the first ciphertext with the numerals corresponding to the letters, to generate a replaced first ciphertext "3248241401553595485114626538805," and extracts ten numerals from the first numeral of the replaced first ciphertext to obtain "3248241401" for use as the second ciphertext; and finally the handheld device subtracts the second ciphertext from the first encrypted telephone number to obtain the unencrypted telephone number "17090141339".

As can be seen from FIG. 4, compared with the corresponding embodiment of FIG. 2, the process 400 of the method for information encryption in the present embodiment additionally provides step 406 and step 407. Therefore, there is a code in the second encrypted telephone number of the scheme described in the present embodiment. The second encrypted telephone number may be locally decrypted by the delivery clerk without the need for inputting a printing date, and the handheld device may find out the random salt corresponding to the code based on the code in the second encrypted telephone number, thereby achieving faster information decryption by the delivery clerk.

Figure 6:
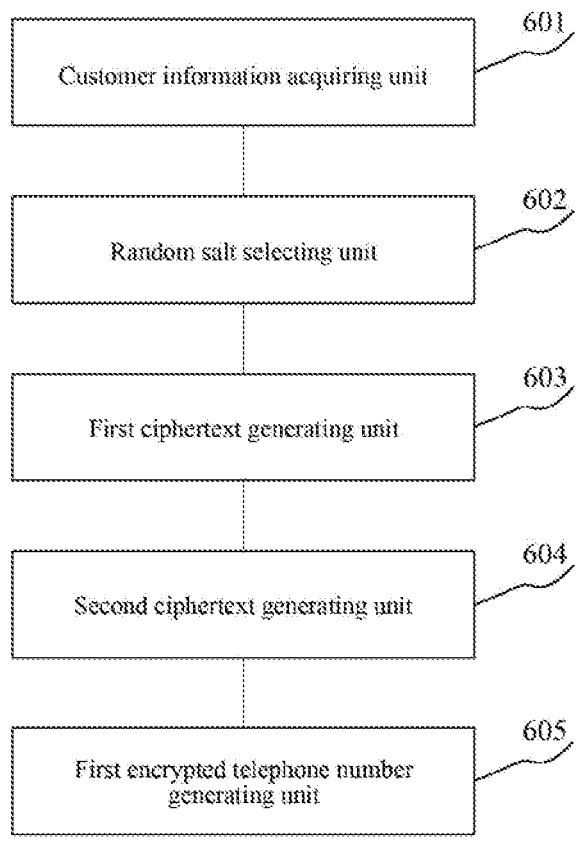
FIG. 6 is a schematic structural diagram of an embodiment of an apparatus for information encryption according to the present disclosure.

Further referring to FIG. 6, as an implementation of the method shown in the above figures, the present disclosure provides an embodiment of an apparatus for information encryption. The embodiment of the apparatus corresponds to the embodiment of the method shown in FIG. 2. The apparatus may be specifically applied to various electronic devices.

As shown in FIG. 6, the apparatus 600 for information encryption shown in the present embodiment includes: a customer information acquiring unit 601, a random salt selecting unit 602, a first ciphertext generating unit 603, a second ciphertext generating unit 604, and a first encrypted telephone number generating unit 605. The customer information acquiring unit 601 is configured to acquire customer information, the customer information including an item order number and a telephone number; the random salt selecting unit 602 is configured to select a random salt corresponding to a current date from a pre-generated random salt list, the random salt list used for storing dates and random salts; the first ciphertext generating unit 603 is configured to encrypt the item order number and the random salt corresponding to the current date using an irreversible encryption algorithm to generate a first ciphertext; the second ciphertext generating unit 604 is configured to generate a numeric second ciphertext based on the first ciphertext; and the first encrypted telephone number generating unit 605 is configured to process the telephone number using the second ciphertext to generate a first encrypted telephone number.

In the present embodiment, the specific processing of the customer information acquiring unit 601, the random salt selecting unit 602, the first ciphertext generating unit 603, the second ciphertext generating unit 604, and the first encrypted telephone number generating unit 605 of the apparatus 600 for information encryption and the technical effects thereof may be referred to the related description in step 201, step 202, and step 203, step 204, and step 205 in the corresponding embodiment of FIG. 2, respectively. The description will not be repeated here.

In some alternative implementations of the present embodiment, the second ciphertext generating unit 604 includes: a first ciphertext determining subunit (not shown in the figure), configured to determine whether there is a letter in the first ciphertext; a second ciphertext generating subunit (not shown in the figure), configured to replace the letter in the first ciphertext with a preset numeral corresponding to the letter in response to determining there being the letter in the first ciphertext, and extract a preset number of numerals from a preset position of the replaced first ciphertext to generate a second ciphertext.

In some alternative implementations of the present embodiment, the second ciphertext generating subunit (not shown in the figure) is further configured to: extract a preset number of numerals from a preset position of the first ciphertext to generate a second ciphertext in response to determining there not being the letter in the first ciphertext.

In some alternative implementations of the present embodiment, the first encrypted telephone number generating unit 605 is further configured to: add the telephone number to the second ciphertext or subtract the telephone number from the second ciphertext to generate the first encrypted telephone number.

In some alternative implementations of the present embodiment, the random salt list is further used for storing codes; and the apparatus 600 for information encryption further includes: a code selecting unit (not shown in the figure), configured to select a code corresponding to the current date from the random salt list; a second encrypted telephone number generating unit (not shown in the figure), configured to combine the code corresponding to the current date with the first encrypted telephone number to generate a second encrypted telephone number.

In some alternative implementations of the present embodiment, the apparatus 600 for information encryption further includes a random salt list updating unit (not shown in the figure), and the random salt list updating unit (not shown in the figure) includes: a random salt determining subunit (not shown in the figure), configured to periodically determine whether there is a random salt corresponding to the current date and/or a future date in the random salt list; and a random salt generating subunit (not shown in the figure), configured to generate the random salt corresponding to the current date and/or the future date in the random salt list in response to determining there not being the random salt corresponding to the current date and/or the future date in the random salt list, and write the generated random salt into a line of the current date and/or the future date in the random salt list.

In some alternative implementations of the present embodiment, the irreversible encryption algorithm is Message Digest Algorithm version 5 (MD5).

Figure 7:
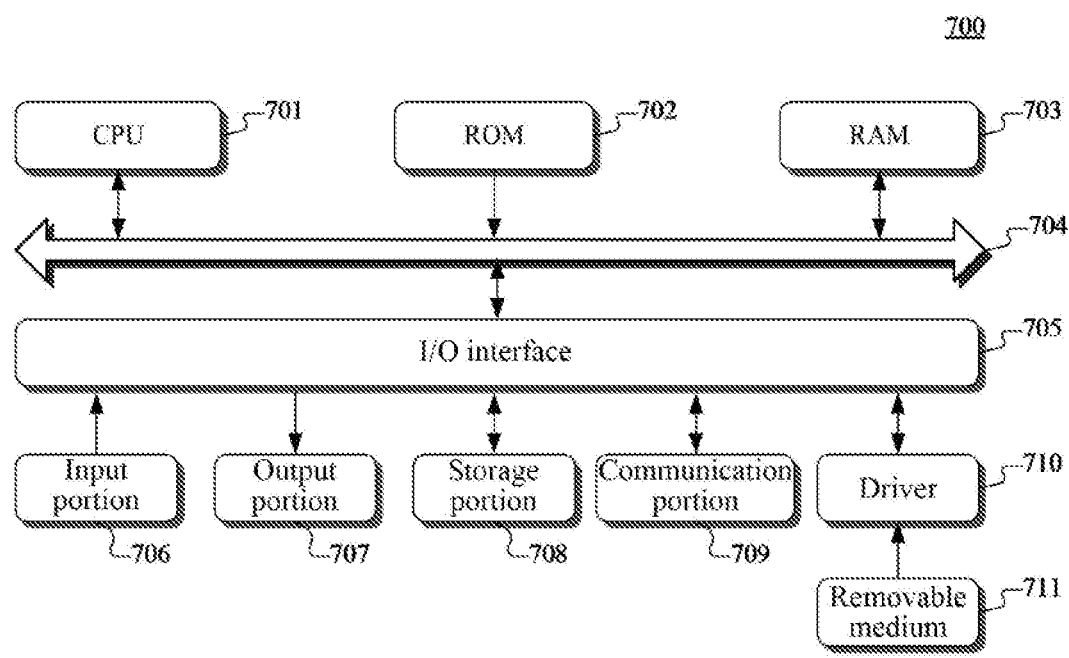
FIG. 7 is a schematic structural diagram of a computer system adapted to implement an electronic device of the embodiments of the present disclosure.

Referring to FIG. 7 below, a schematic structural diagram of a computer system 700 adapted to implement an electronic device of embodiments of the present disclosure is shown. The electronic device shown in FIG. 7 is merely an example, and should not limit the functions and scope of use of the embodiments of the present disclosure.

As shown in FIG. 7, the computer system 700 includes a central processing unit (CPU) 701, which may execute various appropriate actions and processes in accordance with a program stored in a read only memory (ROM) 702 or a program loaded into a random access memory (RAM) 703 from a storage portion 708. The RAM 703 further stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, or the like; an output portion 707 including a cathode ray tube (CRT), a liquid crystal display device (LCD), a speaker, or the like; a storage portion 708 including a hard disk, or the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710 as required, so that a computer program read therefrom is installed on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above functions as defined by the method of the present disclosure.

It should be noted that the computer readable medium may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. Amore specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable storage medium may be any tangible medium containing or storing programs, which may be used by, or used in combination with, a command execution system, apparatus or element. In the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logical functions. It should be further noted that, in some alternative implementations, the functions annotated in the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, including a customer information acquiring unit, a random salt selecting unit, a first ciphertext generating unit, a second ciphertext generating unit, and a first encrypted telephone number generating unit. The names of the units do not constitute a limitation to such units themselves in some cases. For example, the customer information acquiring unit may be further described as "a unit configured to acquire customer information."

In another aspect, the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: acquire customer information, the customer information including an item order number and a telephone number; select a random salt corresponding to a current date from a pre-generated random salt list, the random salt list used for storing dates and random salts; encrypt the item order number and the random salt corresponding to the current date using an irreversible encryption algorithm to generate a first ciphertext; generate a numeric second ciphertext based on the first ciphertext; and process the telephone number using the second ciphertext to generate a first encrypted telephone number.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for infoll iation encryption, comprising:
  acquiring customer information, the customer information including an item order number and a telephone number;
    selecting a random salt corresponding to a current date from a pre-generated random salt list, the random salt list used for storing dates and random salts;
    encrypting the item order number and the random salt corresponding to the current date using an irreversible encryption algorithm to generate a first ciphertext;
    generating a numeric second ciphertext based on the first ciphertext; and
    processing the telephone number using the second ciphertext to generate a first encrypted telephone number.

2. The method according to claim 1, wherein the generating a numeric second ciphertext based on the first ciphertext comprises:
  determining whether there is a letter in the first ciphertext;
  replacing the letter in the first ciphertext with a preset numeral corresponding to the letter in response to determining there being the letter in the first ciphertext, and extracting a preset number of numerals from a preset position of the replaced first ciphertext to generate the second ciphertext.

3. The method according to claim 2, wherein the method further comprises:
  extracting a preset number of numerals from a preset position of the first ciphertext to generate the second ciphertext in response to determining there not being the letter in the first ciphertext.

4. The method according to claim 1, wherein the processing the telephone number using the second ciphertext to generate a first encrypted telephone number comprises:
  perform an addition or subtraction operation on the telephone number and the second ciphertext to generate the first encrypted telephone number.

5. The method according to claim 1, wherein the random salt list is further used for storing codes; and
  wherein the method further comprises:
    selecting a code corresponding to the current date from the random salt list;
    combining the code corresponding to the current date with the first encrypted telephone number to generate a second encrypted telephone number.

6. The method according to claim 1, wherein the method further comprises updating the random salt list, and the updating the random salt list comprises:
  periodically determining whether there is a random salt corresponding to the current date and/or a future date in the random salt list; and
  generating the random salt corresponding to the current date and/or the future date in the random salt list in response to determining there not being the random salt corresponding to the current date and/or the future date in the random salt list, and writing the generated random salt into a line of the current date and/or the future date in the random salt list.

7. The method according to claim 1, wherein the irreversible encryption algorithm is Message Digest Algorithm version 5.

8. An apparatus for information encryption, comprising:
  at least one processor; and
  a memory storing instructions, wherein the instructions when executed by the at least one processor, cause the at least one processor to perform operations, the operations comprising:
    acquiring customer information, the customer information including an item order number and a telephone number;
    selecting a random salt corresponding to a current date from a pre-generated random salt list, the random salt list used for storing dates and random salts;
    encrypting the item order number and the random salt corresponding to the current date using an irreversible encryption algorithm to generate a first ciphertext;
    generating a numeric second ciphertext based on the first ciphertext; and
    processing the telephone number using the second ciphertext to generate a first encrypted telephone number.

9. A non-transitory computer readable storage medium, storing a computer program thereon, wherein the computer program, when executed by a processor, cause the processor to perform operations, the operations comprising:
  acquiring customer information, the customer information including an item order number and a telephone number;
  selecting a random salt corresponding to a current date from a pre-generated random salt list, the random salt list used for storing dates and random salts;
  encrypting the item order number and the random salt corresponding to the current date using an irreversible encryption algorithm to generate a first ciphertext;
  generating a numeric second ciphertext based on the first ciphertext: and processing the telephone number using the second ciphertext to generate a first encrypted telephone number.

10. The apparatus according to claim 8, wherein the generating a numeric second ciphertext based on the first ciphertext comprises:
  determining whether there is a letter in the first ciphertext;
  replacing the letter in the first ciphertext with a preset numeral corresponding to the letter in response to determining there being the letter in the first ciphertext, and extracting a preset number of numerals from a preset position of the replaced first ciphertext to generate the second ciphertext.

11. The apparatus according to claim 10, wherein the operations further comprise:
   extracting a preset number of numerals from a preset position of the first ciphertext to generate the second ciphertext in response to determining there not being the letter in the first ciphertext.

12. The apparatus according to claim 8, wherein the processing the telephone number using the second ciphertext to generate a first encrypted telephone number comprises:
   perform an addition or subtraction operation on the telephone number and the second ciphertext to generate the first encrypted telephone number.

13. The apparatus according to claim 8, wherein the random salt list is further used for storing codes; and
   wherein the operations further comprise:
   selecting a code corresponding to the current date from the random salt list;
   combining the code corresponding to the current date with the first encrypted telephone number to generate a second encrypted telephone number.

14. The apparatus according to claim 8, wherein the operations further comprise updating the random salt list, and the updating the random salt list comprises:
   periodically determining whether there is a random salt corresponding to the current date and/or a future date in the random salt list; and
   generating the random salt corresponding to the current date and/or the future date in the random salt list in response to determining there not being the random salt corresponding to the current date and/or the future date in the random salt list, and writing the generated random salt into a line of the current date and/or the future date in the random salt list.

15. The apparatus according to claim 8, wherein the irreversible encryption algorithm is Message Digest Algorithm version 5.

\* \* \* \* \*